UNITED STATES PATENT OFFICE.

KARL J. HOLLIDAY, OF GLEN OSBORNE BOROUGH, PENNSYLVANIA, ASSIGNOR TO HOLLIDAY CHEMICAL COMPANY, OF PITTSBURGH, PENNSYLVANIA, A CORPORATION OF PENNSYLVANIA.

PRODUCT OF BEESWAX AND PROCESS OF MANUFACTURING THE SAME.

1,264,186.  Specification of Letters Patent.  Patented Apr. 30, 1918.

No Drawing.  Application filed September 26, 1917.  Serial No. 193,247.

*To all whom it may concern:*

Be it known that I, KARL J. HOLLIDAY, a citizen of the United States, and residing in the borough of Glen Osborne, in the county of Allegheny and State of Pennsylvania, have invented or discovered new and useful Improvements in Products of Beeswax and Processes of Manufacturing the Same, of which the following is a specification.

My invention consists in a new and improved product formed from white or yellow beeswax, and which is essentially free from free acids—that is, either entirely free therefrom or containing not more than one per cent. of free acids.

Fats and oils are glyceryl esters while waxes are mixtures containing possibly some glyceryl esters yet mainly esters of high molecular fatty acids with various alcohols, some of such alcohols being aliphatic while others are aromatic.

The exact chemical composition of these waxes is not as yet fully determined. The term "wax" covers a vast field and refers to physical, rather than chemical properties. Thus, paraffin is termed a wax as well as spermaceti. The first is largely a straight chain hydrocarbon of the series $C_nH_{2n}$ plus 2, while the latter is largely an ester of palmitic acid and cetyl alcohol with small amounts of glycerids of lauric, palmitic myristic acids.

Paraffin is almost completely unsaponifiable, while spermaceti is largely saponifiable.

Beeswax occupies a position midway between paraffin and spermaceti, and is a mixture of free cerotic acids, $C_{26}H_{52}O_2$, and myricyl-palmitate, $C_{16}H_{31}O_2$—$C_{31}H_{63}$, and high melting hydrocarbons.

Beeswax has an acid value of 19–21; an ester value of 72–76; the ratio of the one to the other lying between 3.6 and 3.8, and contains from 52% to 55% of higher alcohols and hydrocarbons. The hydrocarbons have an iodin value of 22. The amount of cerotic acid present in beeswax varies from 12% to 14%.

For ages beeswax has been used in the arts and sciences but its use for many purposes has been curtailed by the presence of free cerotic acid which is irritating to the skin and thus renders beeswax unsuitable for many important pharmaceutical purposes. Furthermore, the presence of such free acids renders beeswax unsuitable for use in the arts and sciences where beeswax in a melted state comes into contact with metals.

I have discovered that by removing the free acids from beeswax, a product hitherto unknown is obtained, possessing the valuable physical properties of beeswax but free from the irritating and corroding properties of the same.

This new substance I term "neutral beeswax". It is entirely free from or contains not more than one per cent. of cerotic acid in a free state. This new product is of the greatest value in the arts and sciences, as it is entirely free from irritating substances, and thus may be applied to the skin or even open wounds or burns, and it will not attack metals, such as copper, iron, zinc, &c., even when exposed thereto in a melted state for long periods.

Beeswax in a crude state or bleached white has been used for some purposes in the pharmaceutical trade even with the free acids present, but my new product is of much greater value and capable of much wider use.

My new product may be used either alone, or mixed with other waxes, resins, gums, oils, &c.

I am aware that methods have been described in the literature of beeswax whereby a portion of the free acids may be removed. These methods, however, fail to remove all or substantially all of the free acids but, worse still, do remove relatively large amounts of the neutral esters and other valuable neutral portions of the beeswax.

By means of my new method, I am able to separate the acid portion completely from the neutral portion of the beeswax, and thus obtain a new article of commerce entirely different from and much superior to that made by any previous method.

I am further aware that when beeswax is treated with boiling alcohol, a portion of the free acids are dissolved. But by this method, even upon repeated treatments, the product obtained still contains free acids, and the alcohol has dissolved and removed valuable neutral portions of the beeswax which I am able to retain by my method.

Buchner, in the *Chemical Zeitung*, vol. 31, page 571 (1907) speaks of treating beeswax with ether and removing a portion of the neutral esters, but he found it impossible to prepare by this method the product which I claim. On the other hand, he obtained a product which still contained a substantial amount of free acids, and at the same time he lost large amounts of the neutral portions of the beeswax.

I have discovered that by the use of alkaline liquids, I am able to separate the beeswax into two portions, one portion containing the acids while the other portion contains the neutral esters. This latter is the product which I term "neutral beeswax."

The product is substantially neutral, and has a very low hydrogen ion concentration. This product is of very great value in the arts and sciences. It is non-irritating when applied to open wounds or burns; in a molten state it can be exposed to metals for long periods without corroding the latter, and it exhibits great physical strength, thus making it a valuable product for many purposes.

To obtain this new product I treat the beeswax with alkaline liquids in any one of a number of different ways, but preferably as follows.

I melt say one hundred pounds of beeswax, previously filtered through a cloth to remove gross impurities, such as dead bees, and place the melted substance in a steam jacketed kettle provided with a stirring device. I then add water and heat the combination to the boiling point. About three hundred gallons of water would be required. I then add caustic soda in proper amount to neutralize all or substantially all of the free acids, and stir the mixture until a stable emulsion is formed. The amount of caustic soda required may be determined by the result of a preliminary analysis of the beeswax to discover the amount of free acids in the same.

I then add to the heated emulsion sodium chlorid, sodium sulfate, or their equivalent, in sufficient amounts to cause the emulsion to break, the neutral wax portion rising to the top in the form of an oil, while the soaps are left in solution.

I then separate off the soap solution, and wash the wax with hot brine until the soaps have been eliminated. The brine washings are repeated until the desired result is obtained, which can be determined by means of a phenothalein indicator.

When the soaps have been eliminated, I wash the wax in pure water until all of the salt has been removed. The neutral wax is now substantially free from acids as well as soaps but it may contain some water. I have found that such water is most advantageously removed by raising the wax to a temperature of about 110° C., and allowing it to stand at that temperature for some time. The wax rises to the top, while the water and any remaining traces of soap settle to the bottom and may be easily removed. For this step any temperature over 100° C. may be used, but at a temperature exceeding 125° C. the traces of soaps present would tend to remelt and reënter the wax.

Lewkowetsch in his *Chemical Technology and Analysis of Oils, Fats and Waxes*, Mc-Millan & Co., London, 1914, Vol. II, page 901, states that "The free cerotic acid cannot be extracted from beeswax by treatment with sodium carbonate or caustic alkali, as the resulting soap solution forms with the beeswax esters a complete emulsion which does not separate, even after many months standing (similarly as in the case of wool wax)."

I believe myself to be the first who has been able to separate beeswax into two portions by means of alkaline liquids. I have succeeded in so doing by means of the above described method.

What I desire to claim is:—

1. A new non-irritating and non-corrosive product formed from beeswax and characterized by being essentially free from free acids.

2. A new neutral product formed from beeswax and characterized by the presence of the neutral esters and hydrocarbons of the beeswax and by essential elimination of the free acids of the beeswax.

3. A new product formed from beeswax and characterized by the presence of the neutral esters and hydrocarbons of the beeswax, by essential freedom from the free acids and by being non-irritating to the flesh and non-corrosive when in contact with metals.

4. The process of manufacturing a neutral product from beeswax which consists in mixing the melted beeswax with a base to form an emulsion, then separating said emulsion when heated into its soaps and waxes, and then eliminating the soaps.

5. The process of manufacturing a neutral product from beeswax which consists in mixing the melted beeswax with an alkaline solution to form an emulsion, then separating the soaps and waxes from the said emulsion, while the latter is in a heated state, and then eliminating the soaps.

Signed at Pittsburgh, Penna., this 24th day of September 1917.

KARL J. HOLLIDAY.